United States Patent

McMurtry et al.

[11] Patent Number: 6,012,230
[45] Date of Patent: Jan. 11, 2000

[54] INSPECTION SYSTEM FOR COORDINATE POSITIONING MACHINE

[75] Inventors: David R McMurtry, Wotton-under-Edge; Graham A Hellen, Bristol; Jonathan S Sullivan, Farnborough, all of United Kingdom

[73] Assignee: Renishaw PLC, Gloucestershire, United Kingdom

[21] Appl. No.: 09/303,666

[22] Filed: May 3, 1999

Related U.S. Application Data

[63] Continuation of application No. 08/952,144, Nov. 10, 1997.

[30] Foreign Application Priority Data

Mar. 16, 1996 [GB] United Kingdom ............... 9605609

[51] Int. Cl.$^7$ .................................................. G01B 21/04
[52] U.S. Cl. ............................................ 33/559; 33/560
[58] Field of Search ........................ 33/503, 556, 557, 33/559, 560, 561

[56] References Cited

U.S. PATENT DOCUMENTS

| | | | |
|---|---|---|---|
| 4,649,623 | 3/1987 | Schneider et al. | 33/561 |
| 4,972,594 | 11/1990 | Gurny et al. | 33/558 |
| 5,024,003 | 6/1991 | Breyer | 33/559 |
| 5,028,901 | 7/1991 | Enderle et al. | 33/561 |
| 5,041,806 | 8/1991 | Enderle et al. | 33/561 |
| 5,101,548 | 4/1992 | McMurtry et al. | 901/41 |
| 5,327,657 | 7/1994 | Hajdukiewiez et al. | 33/503 |
| 5,505,005 | 4/1996 | McMurtry et al. | 33/558 |

FOREIGN PATENT DOCUMENTS

| | | |
|---|---|---|
| B2 142 373 | 5/1985 | European Pat. Off. . |
| 25 51 361 | 6/1976 | Germany . |
| 63-4454 | 1/1988 | Japan . |
| 2 167 559 | 5/1986 | United Kingdom . |
| WO 93/01466 | 1/1993 | WIPO . |
| WO 93/09398 | 5/1993 | WIPO . |

OTHER PUBLICATIONS

Renishaw Electrical Limited Sales Brochure, "Autochange Flexible Probe System for Coordinate Machines", published Aug. 1984.

*Primary Examiner*—G. Bradley Bennett
*Attorney, Agent, or Firm*—Oliff & Berridge, PLC

[57] ABSTRACT

A coordinate measuring machine carries a modular touch trigger probe 100, via an adaptor 200, on its movable arm 10. The probe 100 consists of a retaining module 102 which is mounted to the adaptor 200, and a stylus module 104 which is magnetically connected to the retaining module 102 in a manner which enables the exchange of one stylus module 104 for another. The adaptor consists of a pair of coupling members 202,204 which are urged into mutual engagement by magnets 212. Automatic exchange of stylus modules occurs by using movement of the arm 10 to disengage a stylus module 104 from the retaining module 102. Similarly, the exchange of one probe for another is carried out by using movement of the arm 10 to disengage the lower coupling member 204 from the upper coupling member 202. Because magnetic attraction between the coupling members 202,204 is necessarily greater than the attraction between retaining and stylus modules 102,104, lower coupling member 204 has three levers 222, operable by downward relative movement of a release ring 220, which occurs during uncoupling. The levers 222 provide the mechanical advantage necessary to enable movement of the arm 10 to overcome the relatively large magnetic attraction force between coupling members 202,204.

1 Claim, 17 Drawing Sheets

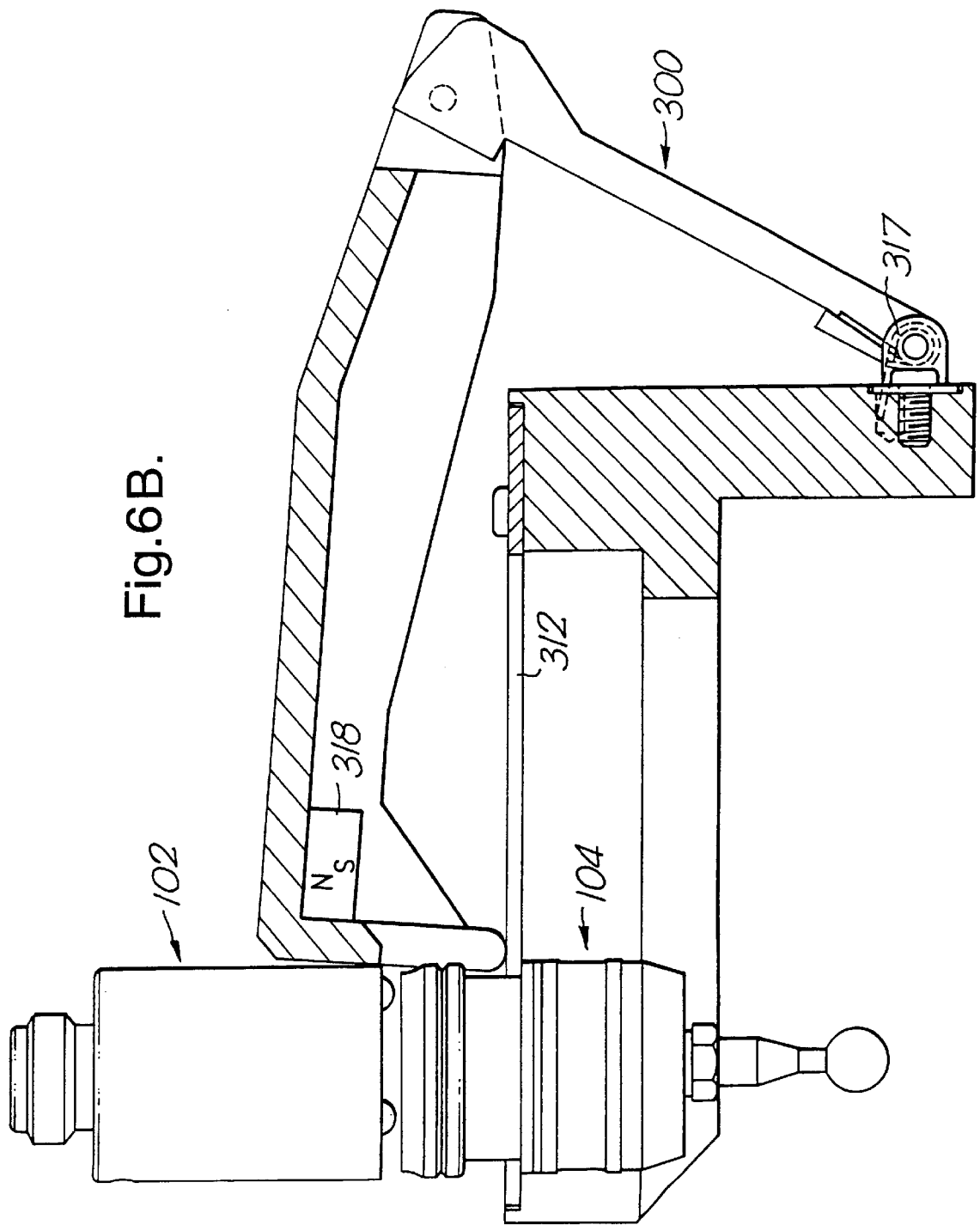

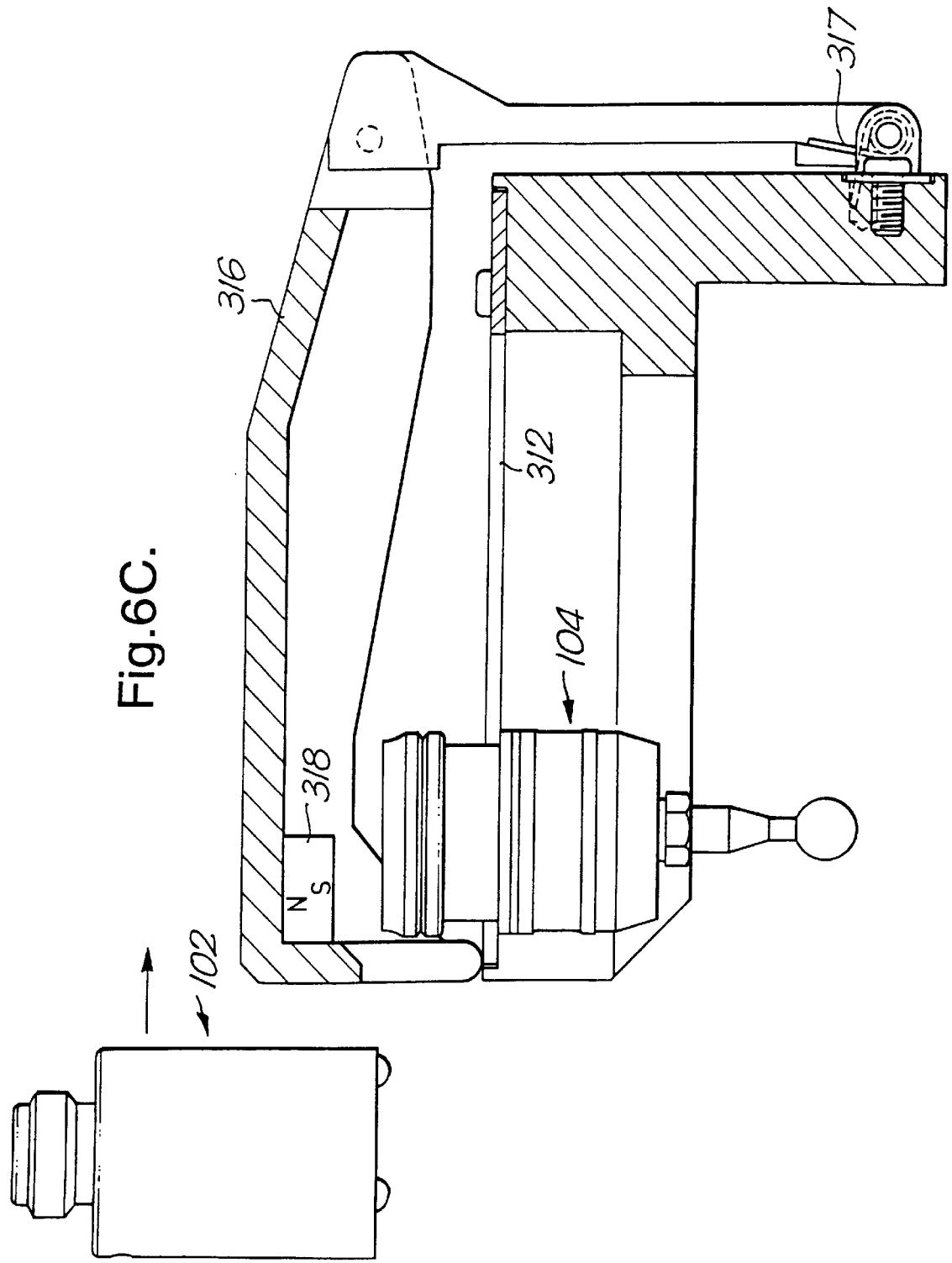

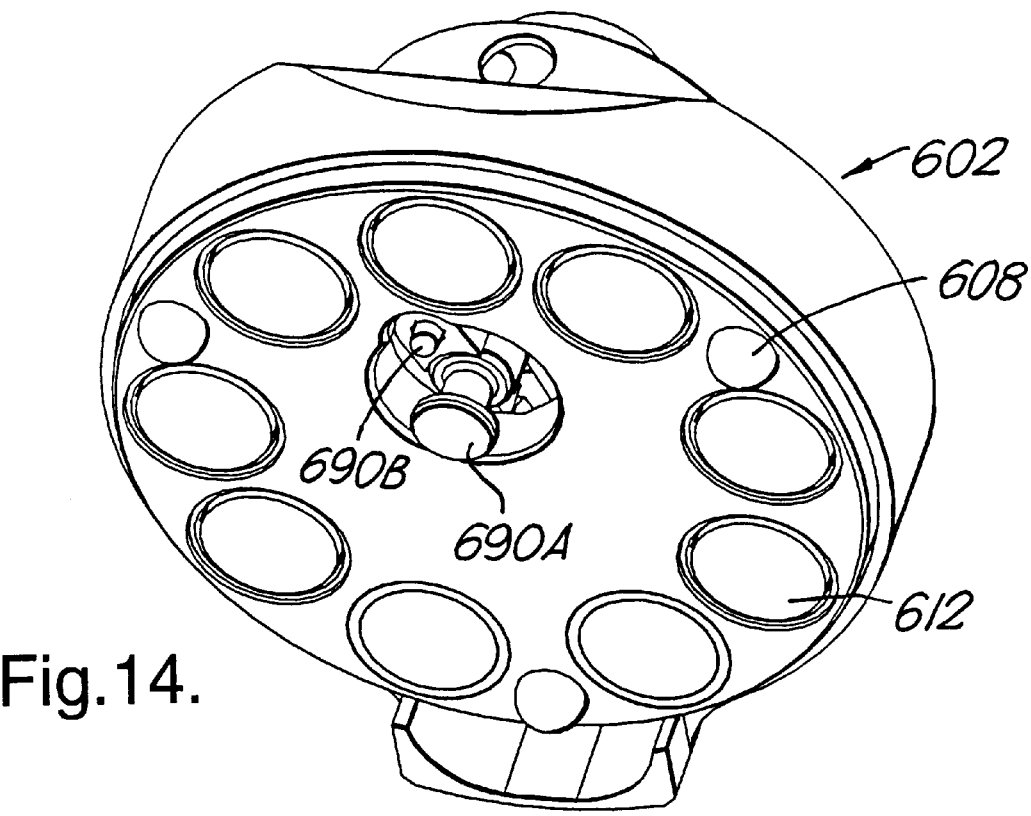
Fig.14.
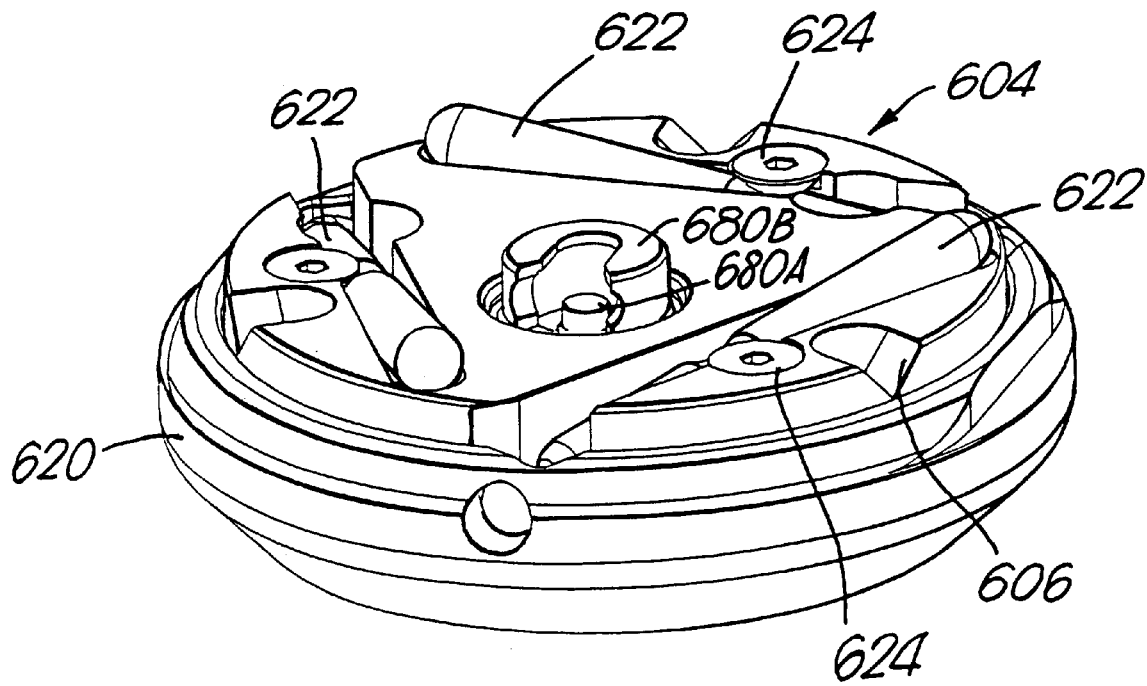

ized value is displayed on a counter 16, so
INSPECTION SYSTEM FOR COORDINATE POSITIONING MACHINE This is a Continuation of Application Ser. No. 08/952,144 filed Nov. 10, 1997. The entire disclosure of the prior application is hereby incorporated by reference herein in its entirety.

The present invention relates to an inspection system for use on a coordinate positioning machine such as a coordinate measuring machine or inspection robot, for example.

A prior art inspection system on a coordinate measuring machine is illustrated in FIG. 1. The coordinate measuring machine includes an arm 10, movable in three linear directions x,y,z relative to a table 12, upon which a part W to be inspected is supported. Displacement of the arm in each of the x,y,z directions is measured by three corresponding encoders, each of which includes a scale 14 and a readhead (not shown). Each encoder generates an incremental output whose instantaneous value is displayed on a counter 16, so that the counters 16 of the x,y, and z encoders may be thought of as displaying the instantaneous positional coordinates of the movable arm 10 relative to an origin, or datum. Movement of the arm of the machine along each of the x,y and z axes is performed by x,y and z servos (which incorporate the x,y and z encoders), and the servos are controlled by means of a machine control unit 18, either on the basis of software containing a pre-programmed sequence of manoeuvres which the user requires the machine to perform, or the instantaneous control of an operator by means of a joystick (not shown).

The movable arm 10 carries a touch probe 20 having an elongate stylus 22 with a spherical sensing tip 24 provided at its free end. The probe 20 is mounted to the arm 10 via an articulating probe head 26 which may rotate the probe 20 about substantially perpendicular rotational axes D and E. In use, the machine control 18 operates the servos of the x,y and z axes, and, where appropriate, the D and E axes of the probe head 26 to drive the movable arm 10 of the machine so that the sensing tip 24 of the probe 20 comes into contact with a surface S of a part W to be measured.

Contact between tip 24 and the surface S causes the emission of a signal to a probe interface unit 30, which then sends a step change, or "trigger" signal to the machine control 18. Upon receipt of the trigger signal, the machine control records the values of the x,y and z counters in order to obtain an indication of the position of the surface S, and also arrests the movement of the movable arm 10.

For added flexibility, a probe-changing magazine 40 is provided, which contains a plurality of different types of inspection probe, suitable for a number of different inspection tasks. The exchange of one probe for another first of all involves the machine control driving the movable arm 10 to a position where the probe 20 which is currently carried on the probe head 26 is positioned in one of the ports 50 of the magazine 40, whereupon an actuating mechanism provided within the magazine 40 disengages the probe 20 from the probe head 26. The arm is then driven to a further port 50 where the probe head 26 may acquire a different probe, engagement of the new probe with the probe head 26 once again being performed by the actuating mechanism within the probe changing magazine 40. Such a probe-changing magazine is known for example from EP 142373.

Yet further flexibility is provided in respect of one type of probe (which, in FIG. 1, is carried on the probe head 26) which includes an electronic retaining module 60, and a stylus module 70 releasably magnetically mounted thereon to enable the exchange of one stylus module 70 for another of a plurality of alternative stylus modules supported in a stylus changing magazine 80. The exchange of stylus modules is performed in a manner similar to that of a probe, with the important exception that the movement of the movable arm 10, powered by the respective x,y,z servos, is used to couple and uncouple the stylus modules 70 from the electronic retaining modules 60. To this extent, the exchange of stylus modules may be regarded as "passive", in that the magazine 80 does not play a role in coupling or uncoupling stylus modules 70. Probes of this type, and the automated "passive" exchange of stylus modules are known from U.S. Pat. No. 5,505,005 and U.S. Pat. No. 5,327,657 respectively.

During probe changing and during stylus changing, the disturbance to the probe circuitry caused by the exchange operation, would unless inhibited, give rise to the emission by the interface 30 of a trigger signal which would in turn halt movement of the arm of the machine, thus preventing the exchange operation from proceeding. Inhibition of a trigger signal during an exchange operation is achieved by means of signals sent from electronic circuitry (not shown) provided in the magazines 40 and 80. The provision of the necessary circuitry in both magazines for inhibiting trigger signals from interface 30 during exchange operations, and the provision of an actuating mechanism for probe changing in the magazine 40 inevitably complicates the installation of these systems on the machine, and increases significantly the cost of the magazines 40 and 80.

The present invention provides an inspection system in which the flexible and passive exchange of both probes and stylus modules is possible using only a single magazine, and which requires no communication or processing circuitry. The disclosed inspection system includes a number of independent inventive aspects, including: a coordinate positioning machine having an arm and a table movable one relative to another, the machine further comprising:

at least one magazine having a plurality of storage ports, at least one of the plurality of storage ports containing a touch probe which comprises a retaining module and a stylus module releasably magnetically engageable with the retaining module to enable exchange of one stylus module for another;

at least one stylus module, contained in one of the storage ports;

a first coupling member connected to the arm of the machine;

at least one second coupling member to which the at least one probe is mounted, the second coupling member being engageable with the first coupling member, the first and second coupling members each having at least one ferromagnetic element, the ferromagnetic elements being co-operable to urge the first and second coupling members into engagement wherein the first and second coupling members are retained in engagement with a greater magnetic force than the retaining module and stylus module;

one of the first and second coupling members having a release member, movable relative to the coupling member, and at least one lever, pivotally connected at one end to the release member, and pivotally connected to the coupling member at a fulcrum, relative movement of the release member and the coupling member causing corresponding pivoting movement of a free end of the lever thereby to urge the first and second coupling members apart against the force of magnetic attraction.

The exchange of stylus modules or probes may be performed passively, using only the movement of the movable arm of the machine to separate modules or coupling members; the magnetic attraction force between modules typically being inherently small enough for the machine to overcome, while the comparatively greater force of attraction between coupling members being overcome with the aid of the or each lever.

In one embodiment the release member is connected to the second coupling member and, when docked in the magazine, a storage port in the magazine engages the release member. During exchange, movement of the second coupling member with the movable arm relative to the storage port causes relative movement of the second coupling member and release member, thereby actuating pivoting of the levers.

In one embodiment of probe, detection of the presence of a surface is by means of a resistance change in a sensor circuit, which is also broken when a stylus module becomes disconnected from a retaining module (for example during an exchange of stylus modules). Disconnection of the stylus module will thus result in the emission of a trigger signal, which, as explained above, will arrest movement of the arm of the machine, making an exchange operation impossible. A further independent aspect of the present invention provides:

a touch probe for use on a coordinate positioning machine comprising a retaining module which may be mounted to a movable arm of the machine, and a stylus module containing a stylus holder which carries a stylus with a sensing tip at a free end thereof for contacting a surface whose position is to be measured, wherein the stylus module is releasably engageable with the retaining module, thereby to enable the exchange of one stylus module for another, the probe including an electrical circuit whose resistance changes when the probe senses a surface, and which is broken when the stylus module becomes disengaged from the retaining module, and switching means within the retaining module operable to short out the electrical circuit in response to a predetermined external influence.

Typically the predetermined external influence may be a magnetic or electrical field (e.g. provided by magnets or electrets in a magazine), in which case the switching means may be a reed switch operable by such a field. Alternatively, the influence may be a mechanical device such as a pair of shorting contacts, engageable with a corresponding pair of terminals in the retaining module. In the latter case, the shorting contacts may be mounted to a magazine in a manner which enables them to move with the retaining module during an exchange operation.

Embodiments of the invention will now be described, by way of example, and with reference to the accompanying drawings in which.

Figure 3:
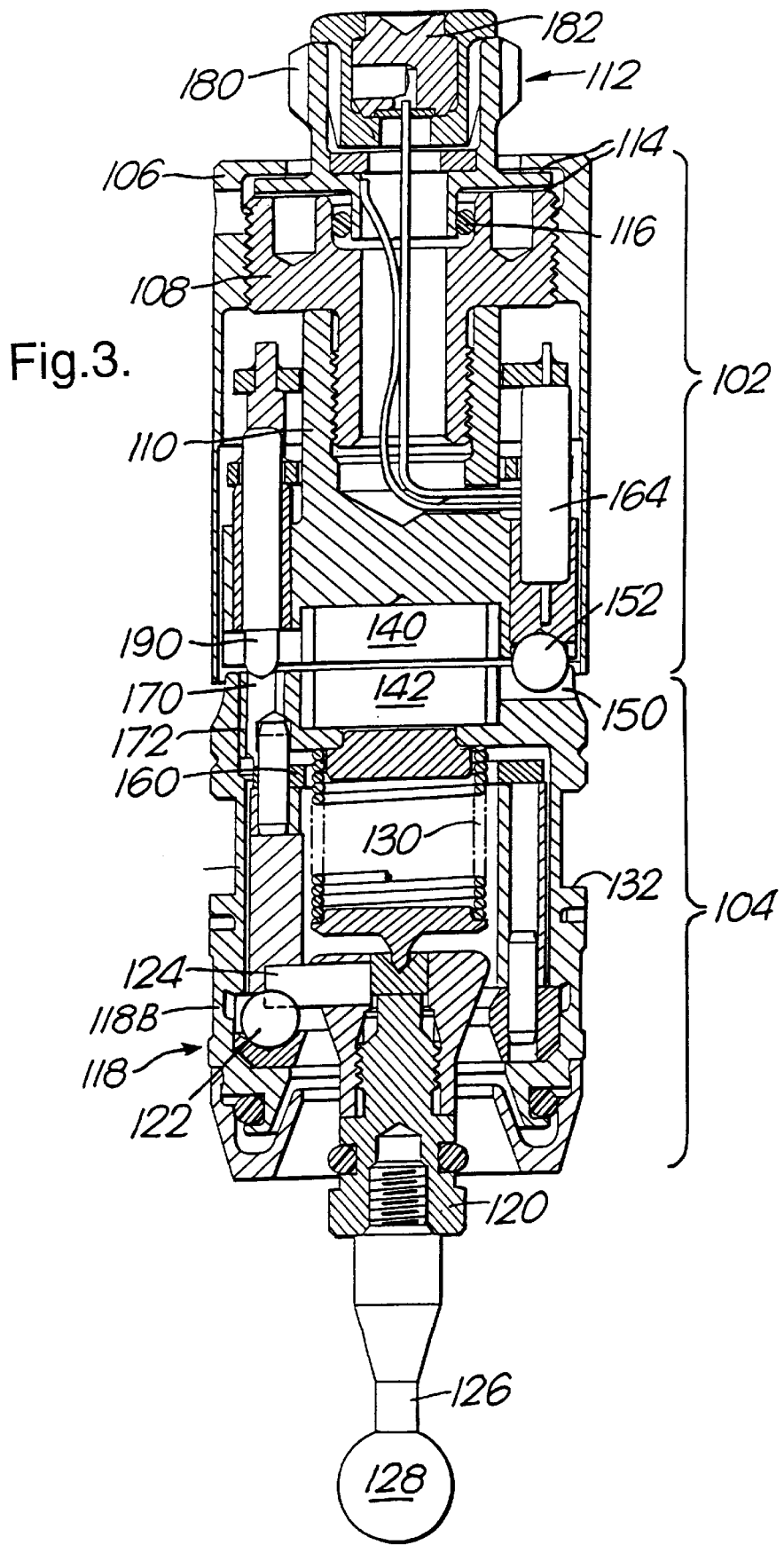
FIG. 3 is a section through a touch probe according to an aspect of the present invention.
Figure 4:
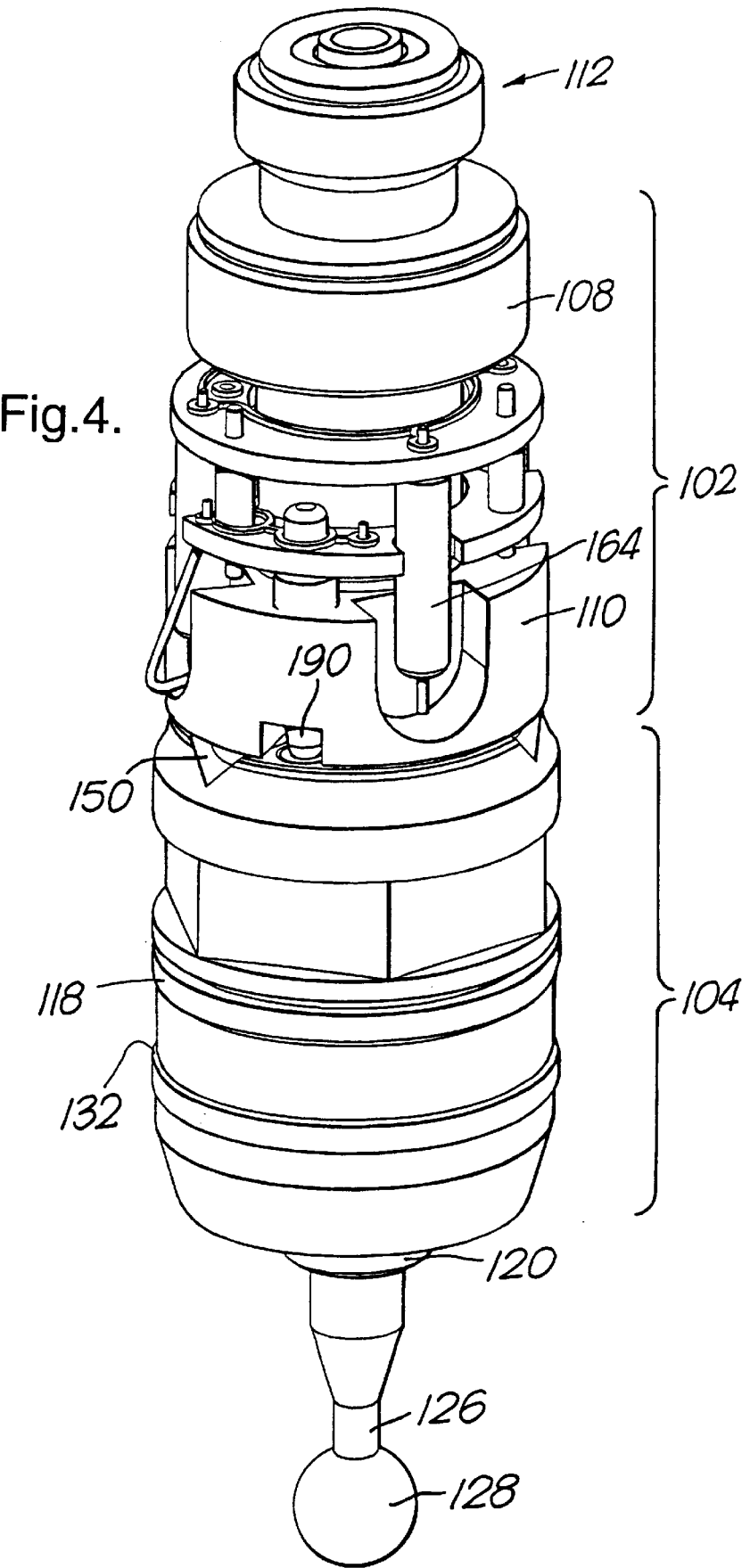
FIG. 4 is a perspective view of the probe in FIG. 3.
Figure 5A:
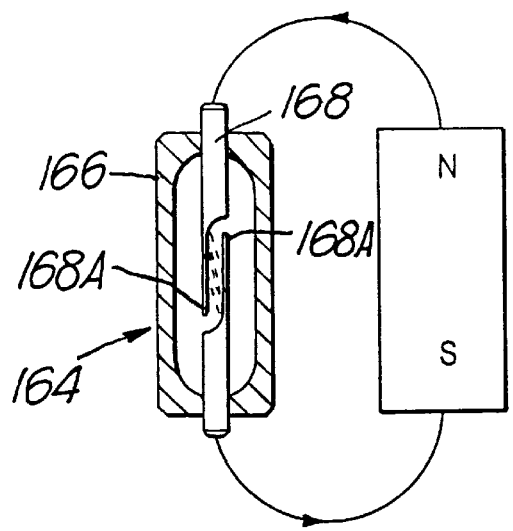
Figure 5B:
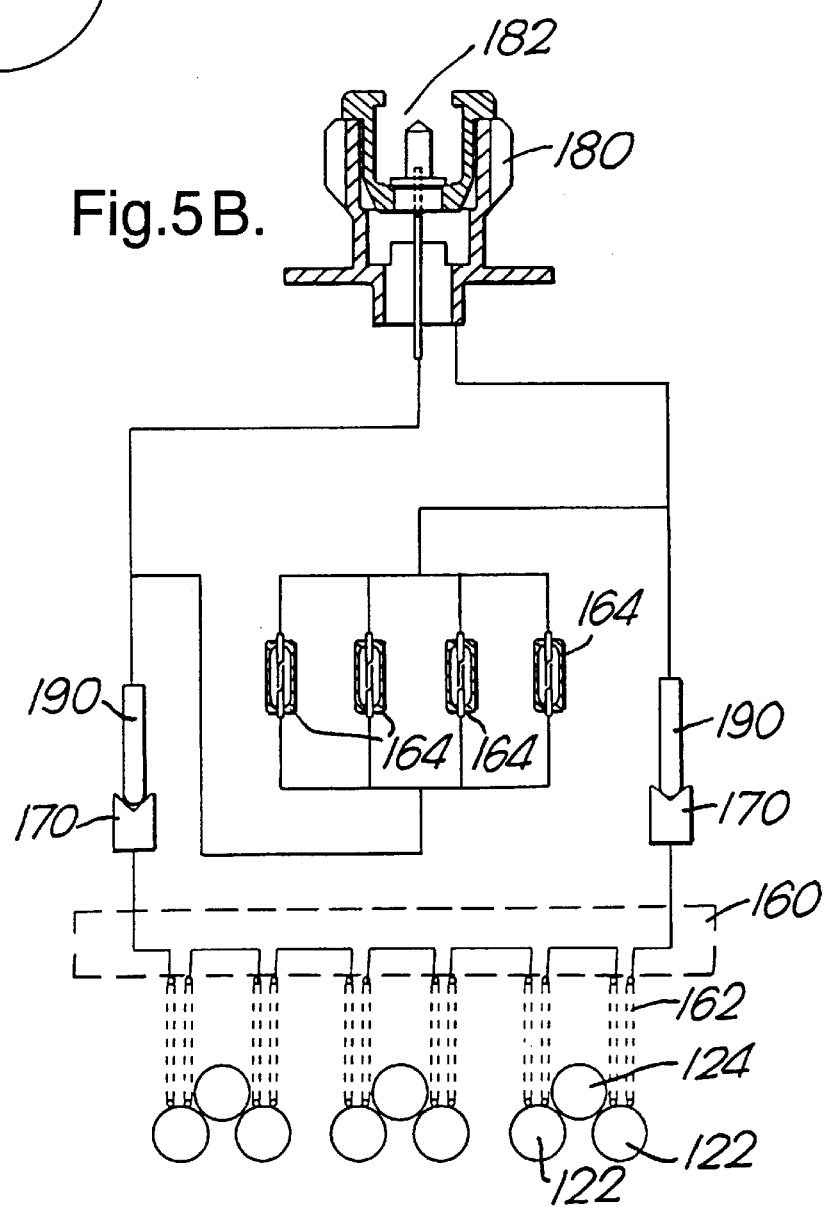
Figure 6A:
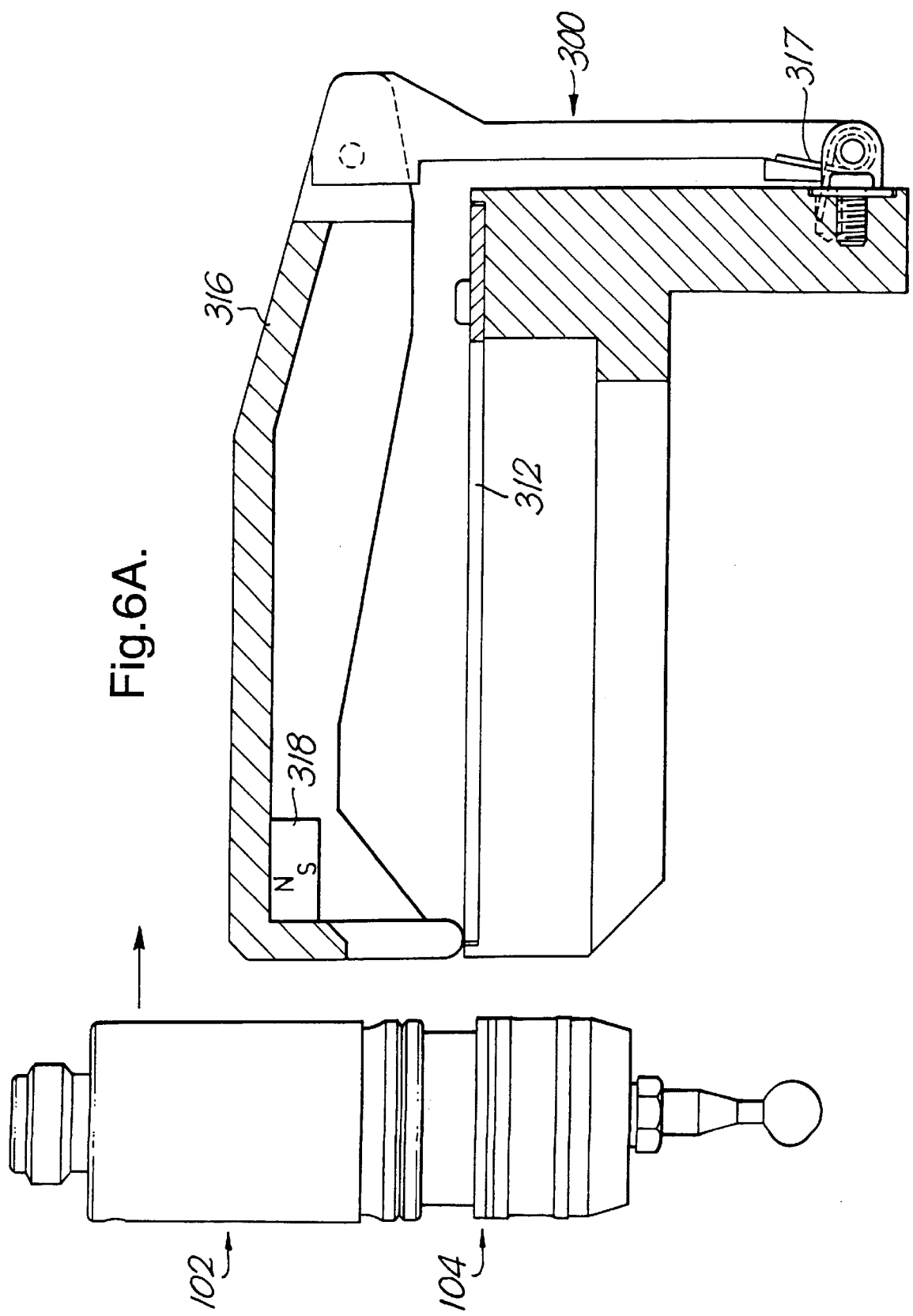
Figure 7:
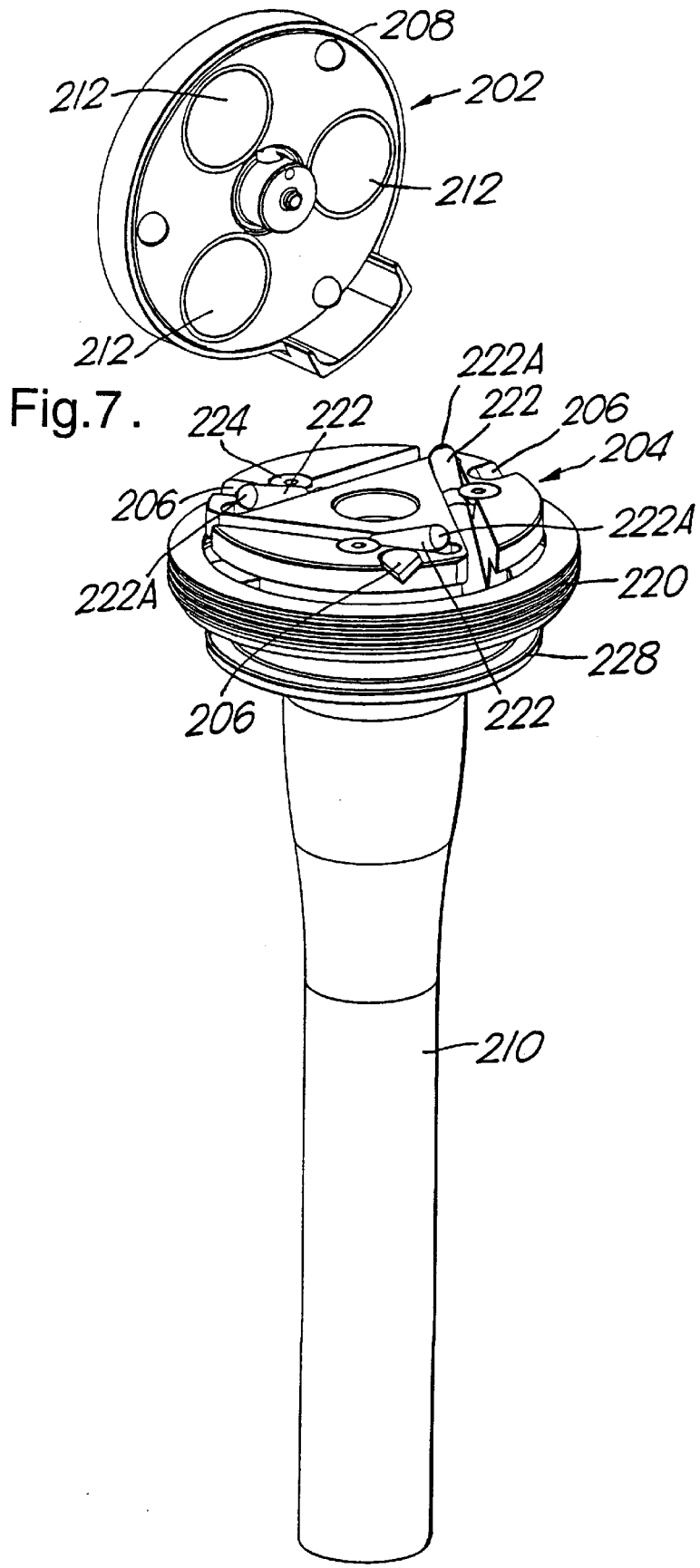
Figures 8, 9:
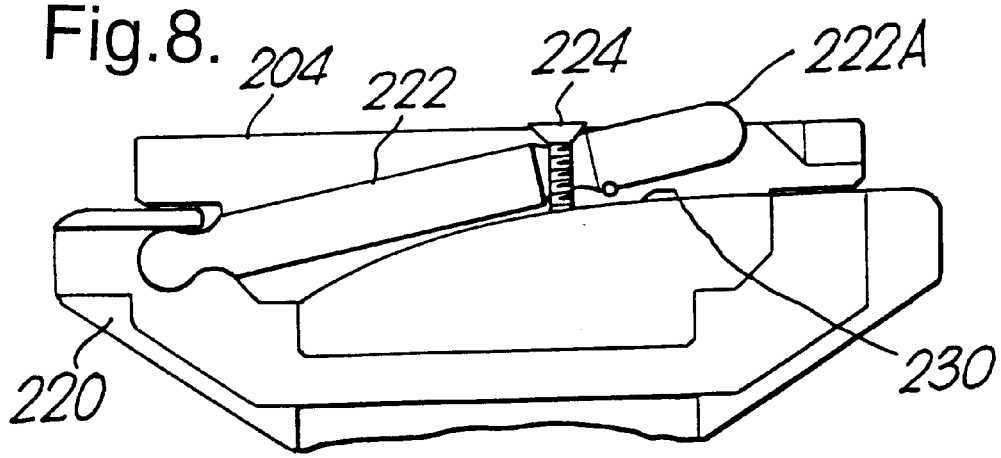
Figure 10A:
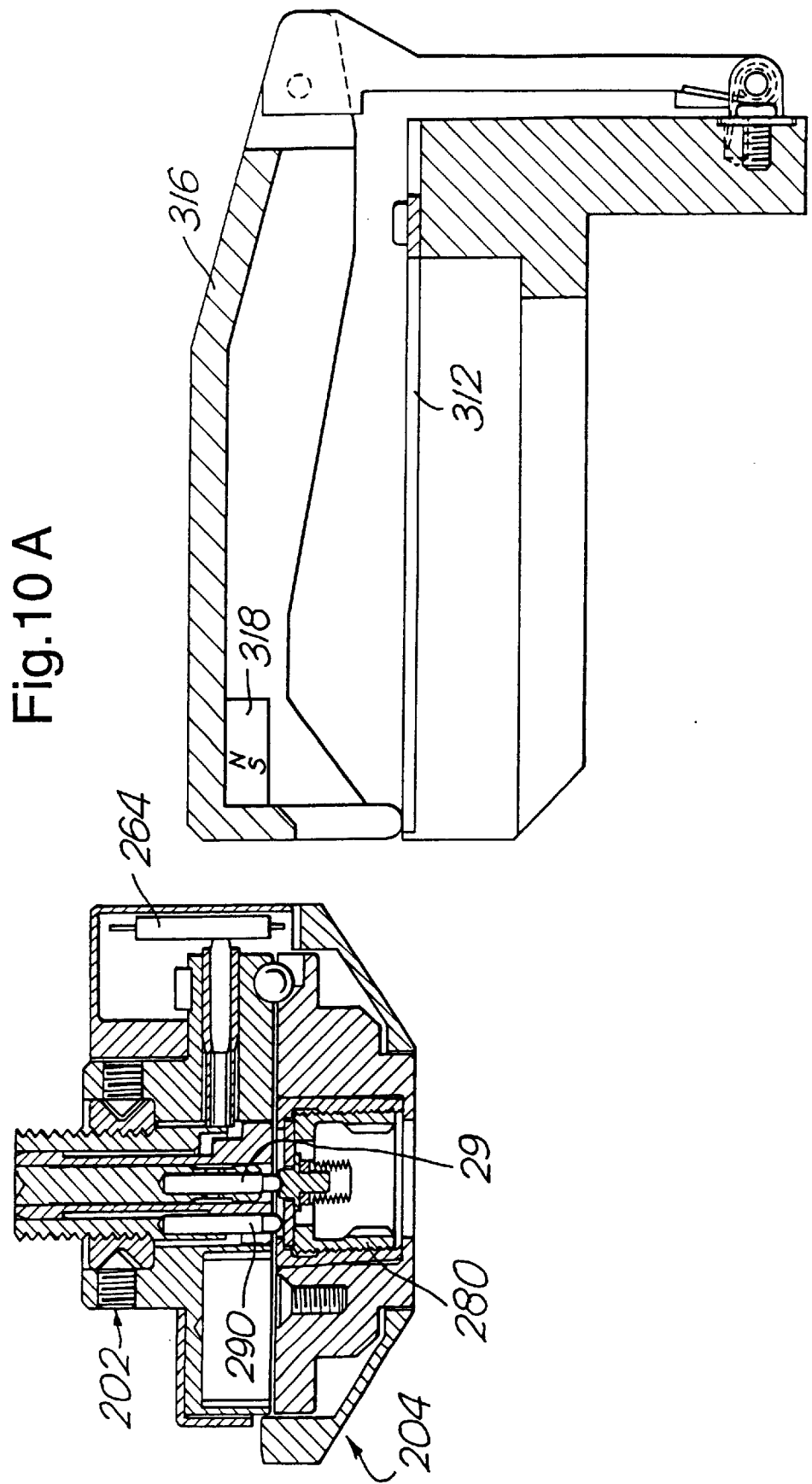
Figure 10B:
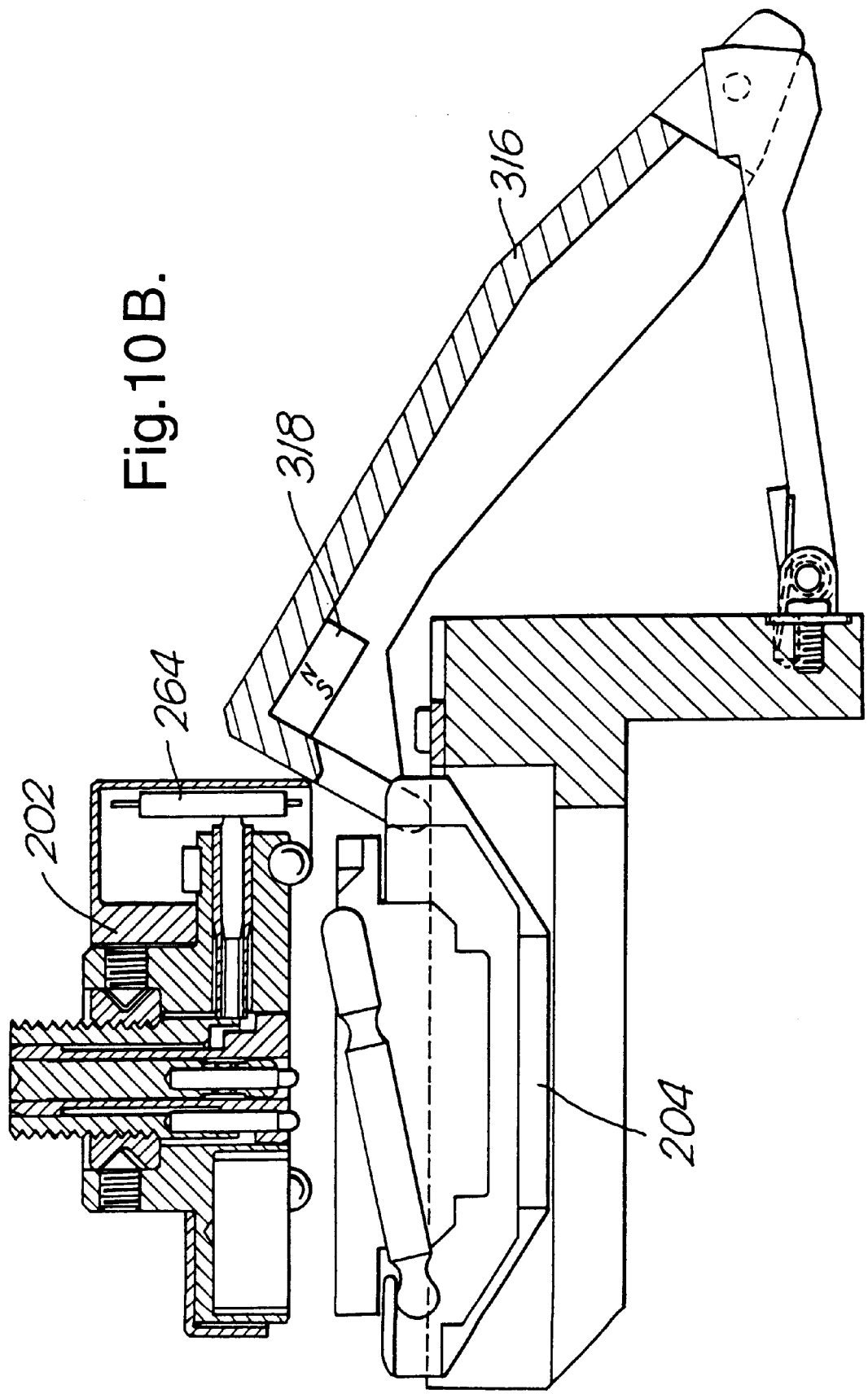
Figure 10C:
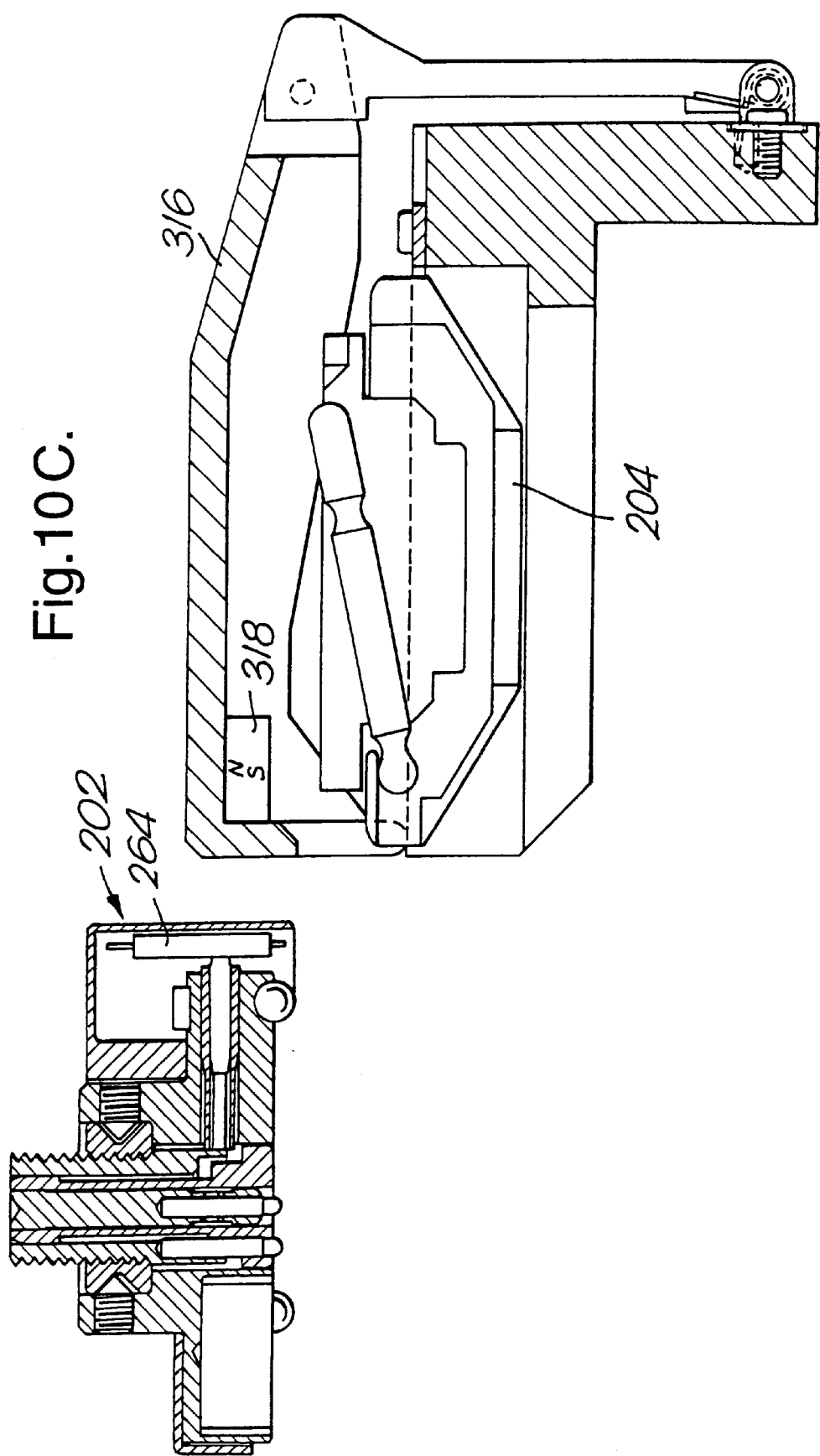
Figure 11:
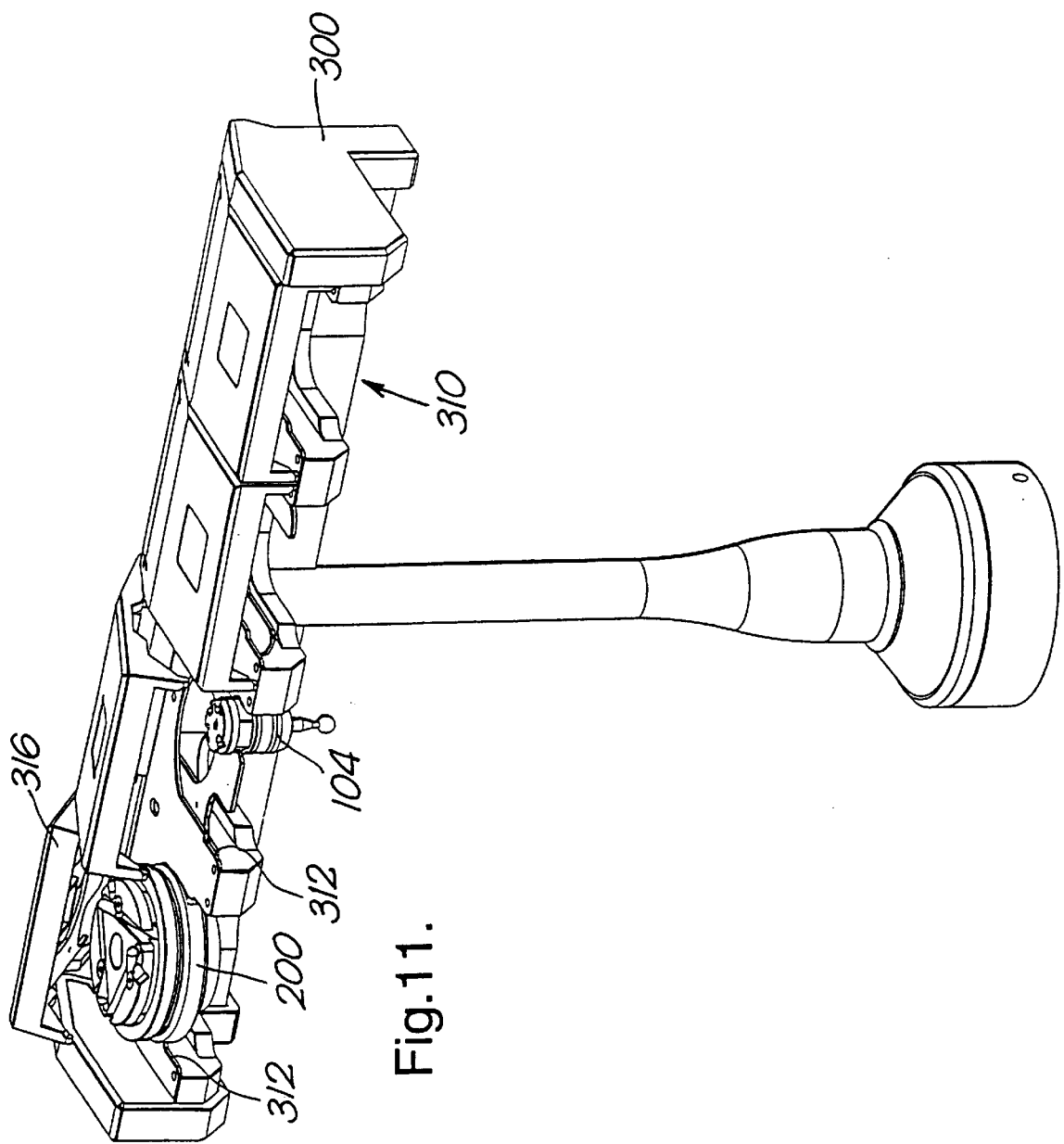
Figure 12:
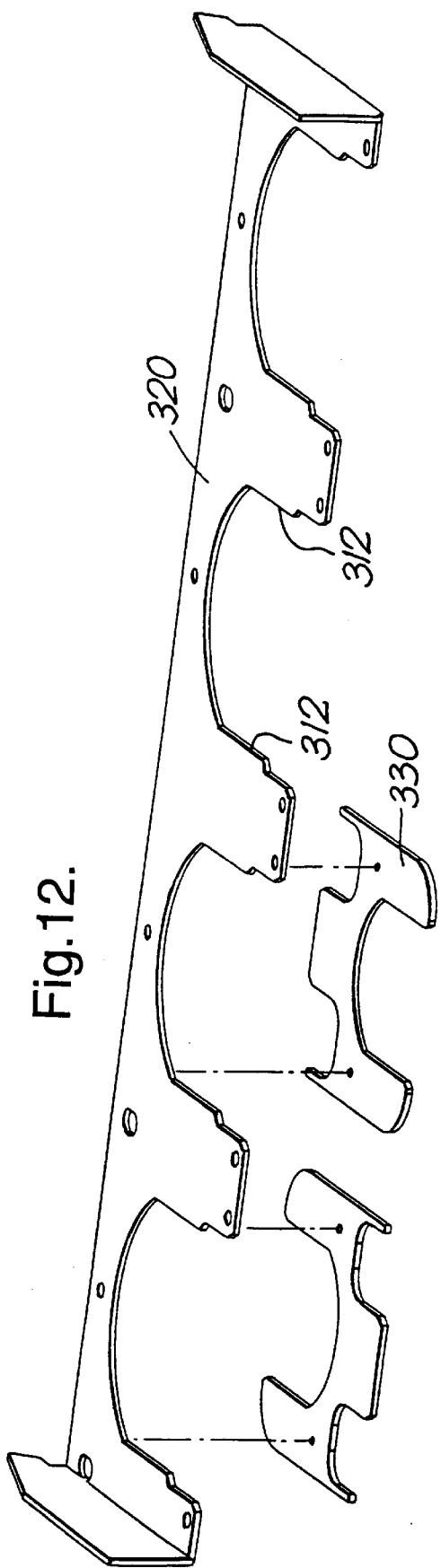

FIGS. 5A and B are circuit details of the probe in FIGS. 3 and 4;

FIGS. 6A–C illustrate an exchange operation involving a stylus module and the electronic retaining module in the probe of FIGS. 3–5;

FIG. 7 is a perspective view of the two parts of a probe coupling according to an aspect of the present invention;

FIG. 8 is a detail of FIG. 7 in section;

FIG. 9 is a graph illustrating the operation of the coupling of FIG. 7;

FIGS. 10A—C illustrate an exchange operation involving the probe coupling of FIG. 7;

FIG. 11 is a magazine according to an aspect of the present invention;

FIG. 12 is a detail of the magazine in FIG. 11; and

Figure 13:
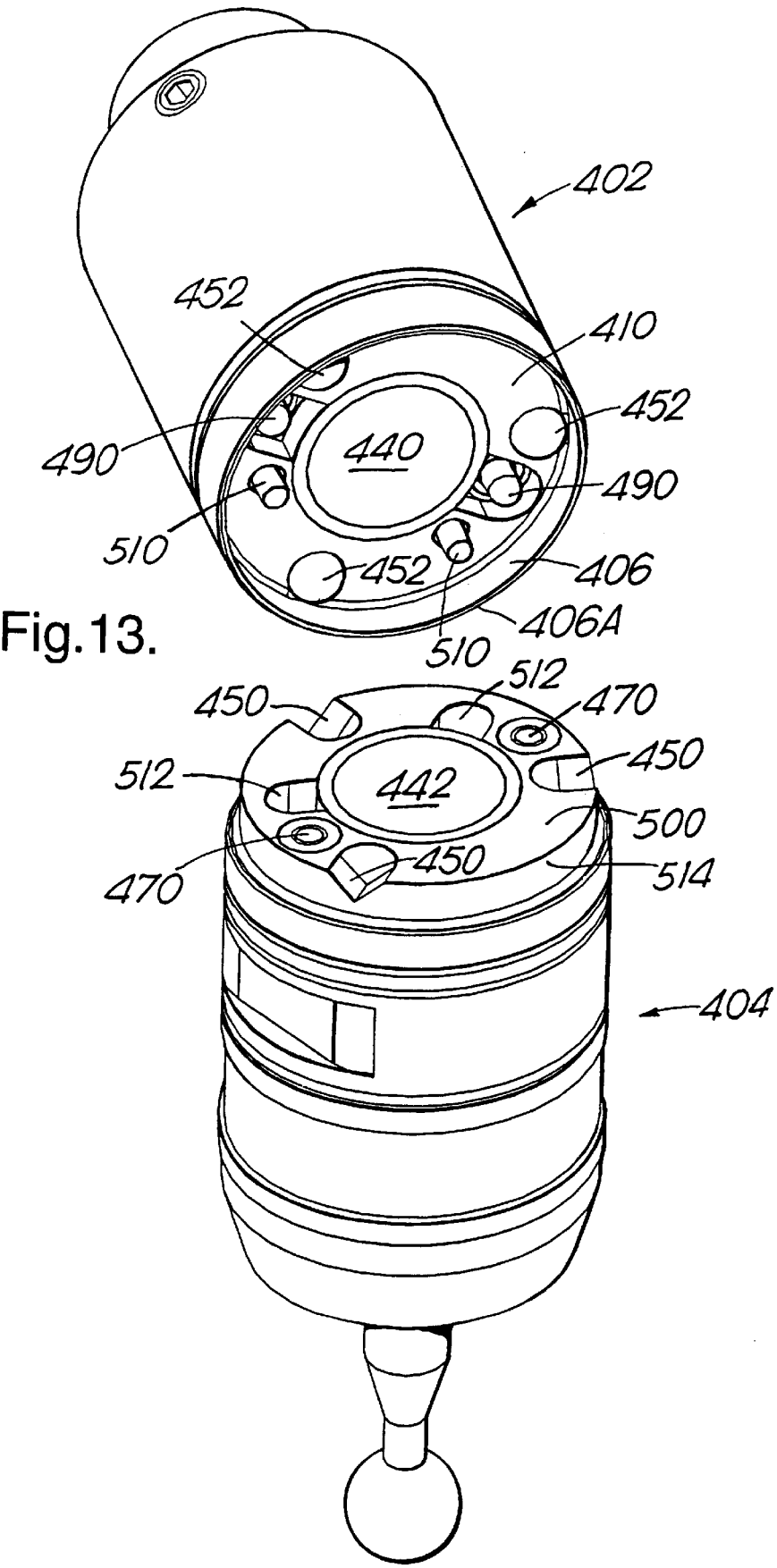

FIG. 13 is a perspective view of a modification of the probe of FIGS. 3 & 4; and FIG. 14 is a perspective view of a modification of the coupling of FIG. 7.

Figure 1:
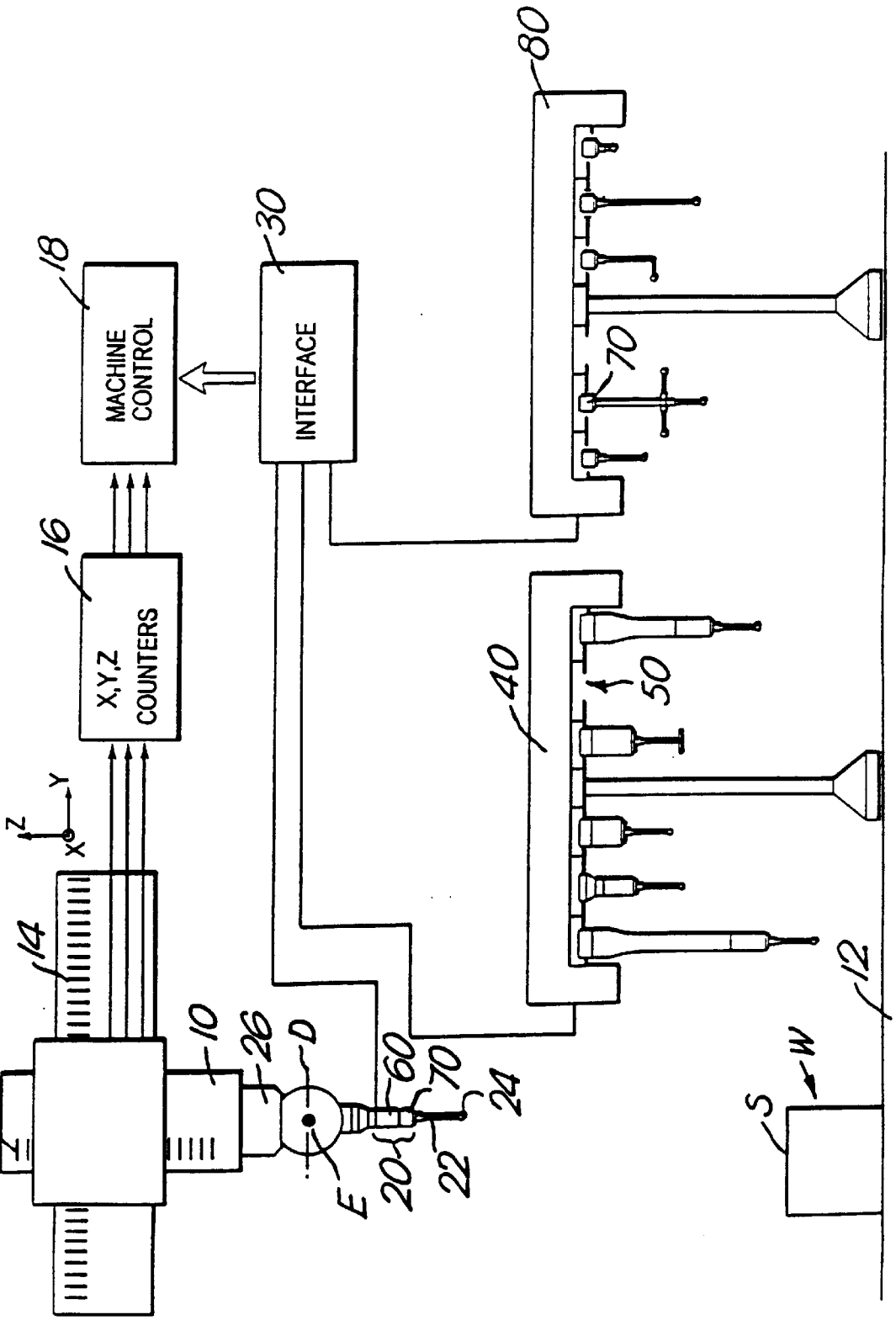
FIG. 1 is an example of a prior art touch probe.
Figure 2:
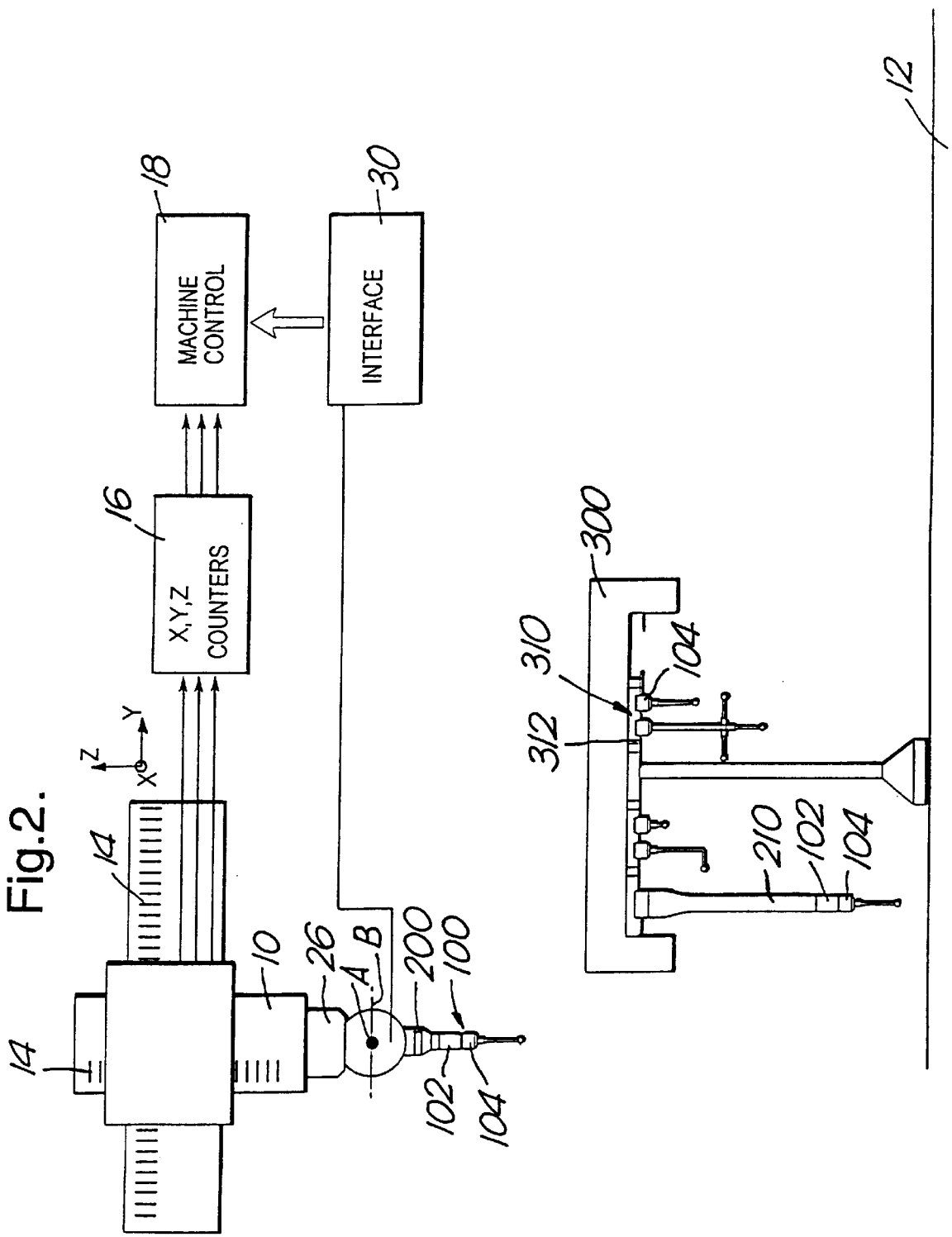
FIG. 2 is a schematic illustration of an inspection system incorporating various aspects of the present invention.

Referring now to FIG. 2, wherein like reference numerals will be used to describe elements of the drawing which are identical to those of FIG. 1, a coordinate positioning machine includes movable arm 10 and a table 12, whose relative displacement in the x,y,z directions is measured by encoders 14, and displayed on counters 16. Movement of the arm 10 is controlled on the basis inter alia of the value of the counters 16, by means of a machine control 18. A modular probe 100 is mounted to the movable arm 10 by means of an intermediate articulating probe head 26, which provides rotational movement of the probe 100 about substantially perpendicular axes D,E.

Referring now additionally to FIGS. 3 and 4, the probe 100 includes a retaining module 102, which is mounted via a coupling adaptor 200 to the probe head 26, and a stylus module 104, which is releasably mountable on the retaining module 102. The retaining module 102 includes a fixed structure provided by a cylindrical housing 106, together with a pair of retaining inserts 108, 110, rigidly connected to the housing 106, and which serve the function of supporting the internal electrical structure of the retaining module 102. The retaining module 102 is mounted to the adaptor 200 via a connector in the form of a screw-threaded boss 112, rigidly held between housing 106 and insert 108 via a pair of nylon washers 114 and an o-ring 116. The stylus module 104 has a rigid casing 118, formed by upper and lower bodies 118A,B. The casing 118 supports a movable stylus supporting member 120 in a kinematic location provided by three pairs of adjacently situated balls 122 on the casing 118, and three rollers 124 projecting from the member 120. The member 120 projects out of the casing, and supports, at its outwardly projecting end, an elongate workpiece-contacting stylus 126 having a spherical sensing tip 128 at its free end. The stylus supporting member 120 is axially biased into its location relative to casing 118 by means of a helical compression spring 130.

The stylus module 104 is releasably mounted onto the electronic retaining module 102 by means of a pair of mutually co-operable ferromagnetic elements 140,142 which, in this example, are permanent magnets (either of which may be replaced by e.g. soft iron), situated on insert 110 of the fixed structure of retaining module 102 and the casing 118 of stylus module 104 respectively. When mounted to retaining module 102, stylus module 104 is kinematically located thereon by virtue of the mutual engagement of three radially extending vee grooves 150 in casing 118 with three equi-spaced spheres 152 located in retaining insert 110.

Referring now additionally to FIG. 5, each of the balls 122 is electrically connected to a printed circuit board 160 by means of conducting springs 162, in such a way as to create a series electrical detection circuit incorporating each of the electrical contacts provided by engagement of a roller 124 with a ball 122. The output terminals 170 of the detection circuit are provided in the upper face of casing 118, and electrically insulated therefrom by means of sleeves 172. Terminals 170 are electrically connected with coaxial terminals 180,182, incorporated into screw-threaded connector 112 via a pair of spring-loaded electrical connecting pins 190, supported in retaining insert 110 and insulated therefrom by sleeves 192. The electrical detection circuit incorporating each of the points of contact of the balls 122 and rollers 124 is thus connected directly to the interface 30 via the coaxial connecting terminals 180,182, the coupling adaptor 200, circuitry within the probe head 26 and further circuitry in the coordinate measuring machine itself (not illustrated). In use, when the movable arm of the machine is driven to bring sensing tip 128 of stylus 126 into contact with a surface S, the contact between the sensing tip 128 causes a movement in the position of stylus supporting member 120, thereby causing a change in the electrical resistance across at least one of the points of contact between balls 122 and rollers 124. This change in resistance is detected in the interface 30, and when the resistance attains a predetermined threshold, interface 30 emits a trigger signal to the machine control 18, which records the outputs of counters 16 at that instant. Upon receipt of the trigger signal the control 18 also arrests movement of the arm 10 relative to the part W; movement of the stylus supporting member 120 relative to casing 118 (known as overtravel) after contact with the sensing tip 128 with the surface S, but before movement of the arm 10 has been arrested is accommodated by the ability of the member 120 to displace from its location relative to casing 118. Once motion of the arm 10 has been reversed, biasing spring 130 acts to relocate the supporting member 120 in its kinematic location.

One stylus module 104 may be exchanged for another during the course of inspection, and this enables differently oriented surfaces on the part W to be inspected by use of different configurations of stylus 126 on different stylus modules 104. Additionally, since different configurations of stylus 126 will have different masses, the spring force in each stylus module 104 may be adapted to the particular configuration of stylus 126 concerned. To this end, a plurality of stylus modules 104 are retained in a magazine 300, having a plurality of storage ports 310.

Referring now to FIGS. 6a–c, exchange of one stylus module 104 for another is performed as follows. The movable arm 10 is moved into register with a vacant stylus port 310, whereupon the arm 10 is then operated to move the probe 100 such that stylus module 104 is docked into the vacant port 310. As can be seen from FIG. 6B, during movement of the retaining module 102 into the storage port 310, the housing 106 of the module 102 bears against upwardly pivoting lid 316 thereby to expose the inwardly projecting limbs 312 (see FIG. 11) of the port 310. Docking between the stylus module 104 and the storage port 310 involves the upward movement of the probe 100, causing engagement of a flange 132 provided on the casing 118 of stylus module 104 with the inwardly projecting limbs 312. (N.B. Permanent magnets provided on the limbs 312 retain the stylus module 104 in place in the storage port 310 irrespective of the orientation of the magazine 300.) Once docking has occurred, the arm 10 continues to move the retaining module 102 vertically upward from the limbs 312, whereby the movement of the arm causes disengagement between stylus module 104 and retaining module 102 (see FIG. 6B). After disengagement (see FIG. 6C) has occurred, the arm is reversed away from the storage port 310, whereupon the lid 316 pivots closed by means of spring 317 in order to protect the engagement elements provided by vee grooves 150 from contamination by airborne particles such as dust. Engagement of the retaining module 102 with a further stylus module 104 is simply the reverse process described above; the retaining module 102 engaging a stylus module 104 during the course of its downward movement once lid 316 has been pivoted to expose the stylus module 104, and simultaneously during the course of this continuous downward movement undocking the stylus module 104 from storage port 310 against the magnetic retention force by virtue of the downward movement of the machine.

Once disengagement between the retaining module 102 and the stylus module 104 has occurred, the electrical detection circuit from the interface 30 incorporating each of the points of contact between the balls 122 and rollers 124 within stylus module 104 will be broken. Since, under normal operating conditions, the interface 30 emits a trigger signal to the machine control 18 when the resistance of the detection circuit rises above a predetermined threshold, and since the aforementioned trigger signal results in the machine control 18 arresting motion of the movable arm 10, a further mechanism is required in order to prevent this if the movable arm 10 is to be able to move to a further storage port 310 in order to engage a further stylus module 104. Referring now additionally to FIGS. 3–5, the electronic retaining module 102 incorporates four magnetic reed switches 164, connected in parallel across the spring-loaded contacts 190. Referring now to FIG. 5A, the switches 164 include a non-ferromagnetic casing 166 into which a pair of ferromagnetic electrical contacts 168 extend. The contacts 168 have ends which project outside of casing 166 in order to enable electrical connection thereto. The inner ends 168A of the contacts 168 are of a relatively small cross-section and are therefore relatively flexible. When a magnetic field is brought into proximity with the reed switch 164, the flux of the field passes along the contacts and causes the flexible ends of the contacts to touch, and to create a closed magnetic circuit. Electric current may thus be passed from one contact 168 to the other only in the presence of a magnetic field.

Each of the lids 316 of the storage ports 310 incorporates one or more permanent magnets 318 at its front edge, and the field from the permanent magnets 318 provided inside the magazine lids 316 ensure that one of the four reed switches 164 remains closed, thus shorting out the detection circuit while the retaining module is within a given proximity of the magazine 300. The retaining module is thus able to move between one storage port 310 and another when the stylus module 104 is disconnected therefrom without causing the emission of a trigger signal from interface 30. It should be noted that four such reed switches 164 are provided in order to ensure operability of this system irrespective of the orientation of the stylus module 102 about its axis.

Shorting out of the electrical detection circuit during an exchange operation has been exemplified by reference to circuits including magnetic reed switches. Other switches, actuable by features on the magazine 300 may be provided. For example, mechanical switches in the retaining module 102 or upper connector 202 may be actuable by protrusions or detents on the rack during exchange.

As well as the automatic exchange of one stylus module 104 for another, the present invention also provides for the automatic exchange of one complete probe 100 for another. Referring now to FIGS. 7 and 8, the coupling adaptor 200 by means of which a probe 100 may be connected to the probe head 26 includes a first coupling member provided by an upper connector 202 which is mounted directly and rigidly to the probe head 26, and a second coupling member provided by lower connector 204, to which the probe 100 is connected either directly or via an extension bar 210. The lower connector 204 may be kinematically located on the upper connector 202 by the mutual engagement of three vee grooves 206 on the lower connector with three appropriately positioned balls 208 on the upper connector; the lower connector 204 is retained in engagement with the upper connector 202 by means of three permanent magnets 212 on the upper connector which co-operate with the ferromagnetic body of the lower connector 204 to provide a retaining force. The size of the retaining force required between the upper connector 202 and lower connector 204 is such that the lower connector 204 should be able to support a probe 100 at the end of an extension bar 210, and be able easily to withstand the pulling force acting to separate upper and lower connectors 202,204 during the automatic exchange of stylus modules 104. The retaining force between upper and lower connectors 202,204 must thus be significantly larger than the retaining force between a stylus module 104 and a retaining module 102. This retaining force is of such a magnitude that the machine is unlikely to be sufficiently powerful to disengage the upper and lower connectors 202,204 simply by virtue of movement of the movable arm 10 during an exchange operation as described above. To enable disengagement of upper and lower connectors 202, 204 by means of movement of the movable arm of the machine, lower connector 204 is provided with an axially movable release ring 220, which operates three levers 222. Downward movement of the release ring 220 causes upward movement of the free ends 222A of levers 222, which bear against the upper connector 202. The mechanical advantage provided by the levers 222 thus enables the initial separation of connectors 202,204 by the application of a relatively small force to release ring 220. Since the magnetic force of attraction between the connectors 202,204 decreases rapidly with increased separation, subsequent separation of the connectors is relatively easy.

Referring now to FIG. 8, levers 222 are retained on lower connector 204 by means of screws 224 having a diameter such that the levers 222 may translate vertically relative to the connector 204 while remaining retained by the screws 224. The surfaces 230 on lower connector 204 against which levers 222 pivot are profiled such that the mechanical advantage provided by the levers 222 varies to compensate for the variation in the magnetic force of attraction between the upper and lower connectors 202,204, as their separation increases, thus ensuring that force required on release ring 222 to increase the separation between the connectors 202, 204 is substantially constant over the entire pivoting action of the levers 222. Referring additionally to FIG. 9, the linear force required to separate the connectors 202,204 is illustrated by a chain-dotted line 240, and the force required to separate a stylus module 104 from a retaining module 102 is illustrated by the dashed line 240. It can be seen that the initial force required to separate connectors 202,204 is approximately six to seven times greater than that required to separate stylus module 104 from retaining module 102. Continuous line 244 illustrates the force required on the release ring 220 to separate connectors 202,204, and it can be seen that this is substantially constant, and approximately 10% greater than the initial force required to separate a stylus module 104 from a retaining module 102. Preferably, the range of operation of the levers 222 should be such that when the levers have pivoted through their fullest extent, the retaining force between the connectors 202,204 is equal to the linear magnetic attraction force given by chain-dotted line 240.

Referring now to FIGS. 10a–c, during an operation involving the exchange of one probe for another, movable arm 10 is operated to bring the articulating probe head 26, and thus adaptor 200, into register with a storage port 310. As previously, permanent magnets 318 provided in the lid 316 of storage port 310 actuate a magnetic reed switch 264 provided in upper connector 202, which thus ensures the interface 30 will not emit a trigger signal when electrical connecting terminals 280,282 on lower connector 204 disconnect from spring-loaded pins 290,292 on the upper connector 202, and the electrical detection circuit incorporating the contact points between the balls 122 and rollers 124 in the probe 100 is broken. As previously, movement of the adaptor 200 into the storage port 310 causes upward and backward tilting of the lid 316 to expose inwardly projecting limbs 312 of the storage port 310, which engage flange 228 (see FIG. 7) on the release ring 220. During subsequent upward movement of the arm 10 and thus the adaptor 200, limbs 312 of the storage port 310 engage flange 228 on the release ring 220 resulting in upward movement of lower connector 204 relative to release ring 220, which is therefore equivalent to downward movement of release ring 220 relative to the adaptor 200. This movement of the release ring 220 causes pivoting of the levers 222 and thus separation of the upper and lower connectors 202,204. The machine is then operated to move upper connector 202 out of storage port 310 (whereupon lid 316 closes), and along the magazine 300 until it comes into register with another storage port 310. As previously, the magnets 318 provided in lids 316 maintain closure of reed switch 264 and thus shorting of the detection circuit thus allowing movement of the machine to drive the upper connector between one storage port 310 and another. Only a single reed switch 264 is provided in the upper connector since the orientation of the upper connector can be adjusted by articulating probe head 26 prior to an exchange operation.

Referring now to FIGS. 11 and 12, the magazine 300 is constructed such that each storage port 310 may support either a pair of stylus modules 104, or a single lower connector 204 carrying a probe 100 (possibly by an extension bar 210). To enable this, the magazine includes a ferromagnetic plate 320 configured such that a plurality of pairs of inwardly extending limbs 312 are provided, the limbs being of such a separation that a lower connector 204 can be magnetically supported thereon. In order to provide a storage port 310 which can retain a pair of stylus modules 104, an adapting insert 330 is provided, which may be fastened to the limbs of plate 320. Additionally, the adapting insert 330 may be oriented in one of two ways relative to plate 320 such that either a pair of stylus modules 104 of relatively small dimensions may be accommodated, or a larger stylus module (not shown) may be accommodated.

A further independent aspect of the present invention thus provides a magazine for use in retaining a plurality of operating modules within the working area of a coordinate positioning machine having a plurality of storage ports, at least one of the storage ports having an insert plate with one pair of first jaws extending in a first direction, and two pairs of second jaws having a narrower spacing than the first jaws and which extend in a second direction, opposite to the first direction, wherein each insert plate is removably secured to the respective storage port thereby to enable each storage port to be used for retention of one relatively large module or two relatively small modules.

A modified form of modular probe will now be described with reference to FIG. 13. The probe includes a retaining module 402 and a stylus module 404 which, as previously, may be releasably mounted to the retaining module 402 by means of a pair of permanent magnets 440,442, provided on the retaining and stylus modules 402,404 respectively, and three balls 452 on the retaining module 402 each of which engages the convergent surfaces provided by three pairs of radially extending vee grooves 450 in the stylus module 404. The stylus module 404 contains an electrical detection circuit the terminals 470 of which are engageable with two axially projecting spring-loaded connecting pins 490 in the retaining module 402. Thus far, the modular probe described is functionally identical to the probe described in FIGS. 3–5.

However, we have found that it is possible (for example, as a result of an accidental machine crash) for the stylus module to be mis-positioned on the retaining module 402 with neither of the connecting pins 490 engaging the terminals 470, but that nonetheless the resistance of the detection circuit as detected at the interface 30 is such that the probe is considered still can operational. This can occur in the situation where the upper face 500 of the casing 418 of the stylus module 404 engages one of the spring-loaded connecting pins 490, and simultaneously touches the rim 406A of the retaining module housing 406. Since the housing behaves as an electrical earth, the current in the detection circuit effectively shorts between one of the connecting pins 490 and ground (provided by the housing 406); the resistance of the detection circuit as detected at the interface 30 thus being the same as in normal operation of the probe. To avoid this situation the rim 406A of housing 406 has been extended, and a pair of axially projecting locating pins 510 are provided. The pins 510 extend from the retaining insert 410 at the open end of the retaining module housing 406, and project beyond the ends of connecting pins 490. The locating pins prevent the upper face 500 of the stylus module casing 418 shorting the connecting pins 490 to the housing 406, since the upper face 500 can no longer simultaneously contact the connecting pins 490 and the housing rim 406A. To accommodate the extended housing rim 406A and the locating pins 510, the upper face 500 of the stylus module casing 418 contains a pair of axially extending recesses 512, and the casing 418 of the stylus module has a necked portion 514. When the retaining module 402 and stylus module 404 are mutually engaged, the locating pins 510 and necked portion 514 project into the recesses 512 and the housing 406 respectively with a clearance such that the location of the stylus module 404 on the retaining module 402 is determined solely by the kinematic engagement elements 450,452.

A further aspect of the present invention thus provides a touch probe for use on a movable arm of a coordinate positioning machine, having a retaining module which may be mounted to the movable arm, and a stylus module which is releasably engageable with the retaining module thereby to enable exchange of one stylus module for another, the retaining module comprising:

a substantially cylindrical housing;

an electrical connector which projects from one end of the housing, and which has a pair of coaxial electrical terminals;

three kinematic engagement elements, substantially equispaced about the axis of the housing, and situated at an open end of the housing distal to the electrical connector;

a pair of axially projecting electrical contact pins, axially biased toward the open end of the housing, each of the contact pins being electrically connected to one of the coaxial terminals;

a pair of axially projecting locating pins, situated at the open end of the housing;

the stylus module comprising:

a substantially cylindrical casing having an aperture at one end through which a stylus projects;

a stylus holder within the casing, the stylus holder having at least one seating element which is engageable with a corresponding seating element to locate the stylus holder within the casing;

biasing means for applying an axial biasing force to the stylus holder, thereby to bias the seating elements into mutual engagement;

an electrical circuit which incorporates the elements of the seating, having a pair of axially facing output terminals situated at an end of the casing distal to the aperture and which are engageable with the spring loaded contact pins on the retaining module;

three further kinematic elements situated at the distal end of the casing, being substantially equispaced about the axis, all the kinematic elements being mutually engageable to locate the stylus module on the retaining module;

a pair of axially extending recesses situated at the distal end of the casing, and into which the locating pins on the retaining module extend when the stylus module is engaged with the retaining module;

wherein when the stylus module and retaining module 1are engaged the distal end of the stylus module casing projects into the open end of the retaining module housing.

Yet a further aspect of the present invention provides a stylus module for a touch probe having:

a casing;

a stylus holder within the casing, the stylus holder and casing having at least one pair of mutually engageable elements which form a seating for the stylus holder in the casing;

biasing means for applying an axial biasing force to the stylus holder, to bias the mutually engageable elements of the seating into engagement;

an electrical detection circuit for detecting deflection of the stylus holder which results in disengagement of the elements of the seating, and having a pair of output terminals in an upper end of the casing; the upper end of the casing also including:

a ferromagnetic element to enable the stylus module to be magnetically retained on a retaining module;

three kinematic engagement elements which may form a kinematic support in conjunction with corresponding elements on the retaining module, the kinematic engagement elements being spaced substantially equidistantly about the axis; and a pair of axially extending recesses.

In a further modification, the probe of FIG. 13 has only a single reed switch, and the housing 406 of the retaining module 402 may rotate relative to the screw-threaded connector to align the reed switch adjacent magnets in the rack.

FIG. 14 shows a modification of the probe coupling of FIG. 7 comprising upper and lower coupling members 602,604 respectively, urged into mutual engagement by means of magnets 612, and into a kinematic location by means of balls 608 and vee grooves 606. As previously, the lower coupling member 604 includes an axially movable release ring 620 pivotally connected to one end of each of three levers 622, which are in turn pivotally mounted on the lower coupling member 604 by means of bolts 624. In this embodiment of coupling, electrical connection between the coupling members involves the engagement of a pair of axially biased connecting pins 690A,B, on the upper coupling member 602, with terminals 680A,B on the lower connector 604. The terminal 680B is configured so that, in the event of a machine crash, acting to displace the lower coupling member 604 from engagement with the upper coupling member 602, the coupling members 602,604 will remain in close proximity, because the connecting pin 690A will catch within the terminal 680B, preventing the lower connector 604, together with any probe and/or extension bar carried thereby, from falling off completely.

Various aspects of the foregoing system provide both separately and in combination, the passive exchange of both probes and stylus modules, and therefore avoid the need for any communication between the magazine 300 and the interface 30 of the machine. This represents substantial simplification over the systems of the prior art.

No aspect of the present invention need necessarily be embodied by any of the specific features or functions described above, and each feature or function referred to may be substituted by other features performing the same or a similar function, and other functions achieving the same or a similar result. One particular example of this, is that the various locations of elements of the inspection system described have been performed by kinematic supports. Other types of location may be provided whose positional repeatability is adequate for the task required. In this respect it should be understood that no degree of accuracy is either implied or required with respect to the use of the term repeatability beyond the requirement that the specific configuration of engagement elements employed enable the locating mechanism between a pair of elements to function as required by the user.

The different features of the invention described above are not necessarily limited to their association with the embodiments in connection with which they were described. Many aspects of the invention are generally applicable to other embodiments of the invention described herein.

We claim:

1. A touch probe for use on a movable arm of a coordinate positioning machine, having a retaining module which may be mounted to the movable arm, and a stylus module which is releasably engageable with the retaining module thereby to enable exchange of one stylus module for another, the retaining module comprising:

a substantially cylindrical housing;

an electrical connector which projects from one end of the housing, and which has a pair of coaxial electrical terminals;

three kinematic engagement elements, substantially equispaced about the axis of the housing, and situated at an open end of the housing distal to the electrical connector;

a pair of axially projecting electrical contact pins, axially biased toward the open end of the housing, each of the contact pins being electrically connected to one of the coaxial terminals;

a pair of axially projecting locating pins, situated at the open end of the housing;

the stylus module comprising:

a substantially cylindrical casing having an aperture at one end through which a stylus projects;

a stylus holder within the casing, the stylus holder having at least one seating element which is engageable with a corresponding seating element to locate the stylus holder within the casing;

biasing means for applying an axial biasing force to the stylus holder, thereby to bias the seating elements into mutual engagement;

an electrical circuit which incorporates the elements of the seating, having a pair of axially facing output terminals situated at an end of the casing distal to the aperture and which are engageable with the spring loaded contact pins on the retaining module;

three further kinematic elements situated at the distal end of the casing, being substantially equispaced about the axis, all the kinematic elements being mutually engageable to locate the stylus module on the retaining module;

a pair of axially extending recesses situated at the distal end of the casing, and into which the locating pins on the retaining module extend when the stylus module is engaged with the retaining module;

wherein when the stylus module and retaining module are engaged the distal end of the stylus module casing projects into the open end of the retaining module housing.

* * * * *